(12) United States Patent
Baucher et al.

(10) Patent No.: US 11,052,533 B2
(45) Date of Patent: Jul. 6, 2021

(54) ENGINE ASSEMBLY STAND

(71) Applicant: SAFRAN AIRCRAFT ENGINES, Paris (FR)

(72) Inventors: Stéphane André Baucher, Etiolles (FR); Eric Berthe, Bussy Saint Georges (FR); Clément Paul Claude Guinot, Thorigny sur Marne (FR); Manuel Daniel Martins, Pallancourt-sur-Essonne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 520 days.

(21) Appl. No.: 15/770,368

(22) PCT Filed: Oct. 27, 2016

(86) PCT No.: PCT/FR2016/052791
§ 371 (c)(1),
(2) Date: Apr. 23, 2018

(87) PCT Pub. No.: WO2017/072449
PCT Pub. Date: May 4, 2017

(65) Prior Publication Data
US 2018/0311808 A1 Nov. 1, 2018

(30) Foreign Application Priority Data
Oct. 29, 2015 (FR) ........................................ 1560377

(51) Int. Cl.
*B25H 1/00* (2006.01)
*F01D 25/28* (2006.01)
*B62D 65/18* (2006.01)

(52) U.S. Cl.
CPC ............ *B25H 1/0007* (2013.01); *B62D 65/18* (2013.01); *F01D 25/285* (2013.01); *F05D 2230/68* (2013.01)

(58) Field of Classification Search
CPC .. B23P 19/04; B23Q 1/01; B23Q 1/25; B23Q 1/265; B23Q 1/48; B23Q 1/527;
(Continued)

(56) References Cited

U.S. PATENT DOCUMENTS 1,495,394 A * 5/1924 Bergsten ................. E21B 19/06
294/91
1,541,986 A * 6/1925 Martin .................... E21B 19/06
294/91
(Continued)

FOREIGN PATENT DOCUMENTS

CN 201494922 U 6/2010
FR 2 952 842 A1 5/2011
(Continued)

OTHER PUBLICATIONS

International Search Report for International Application No. PCT/FR2016/052791 dated Mar. 24, 2017.
(Continued)

*Primary Examiner* — Joseph J Hail
*Assistant Examiner* — Arman Milanian
(74) *Attorney, Agent, or Firm* — Pearne & Gordon LLP

(57) ABSTRACT

The assembly stand comprises two parallel posts (1), a horizontal girder (6) which connects the tops of the posts and is vertically movable, and a suspension frame (17) which can be displaced along the movable girder in a lateral direction and is further suitable for turning the engine (M) mounted thereon about the main axes. A lifting block (10) is provided with a lifted load sensor to record the total weight of the engine (M). The device advantageously comprises a (Continued)

Figure 1:
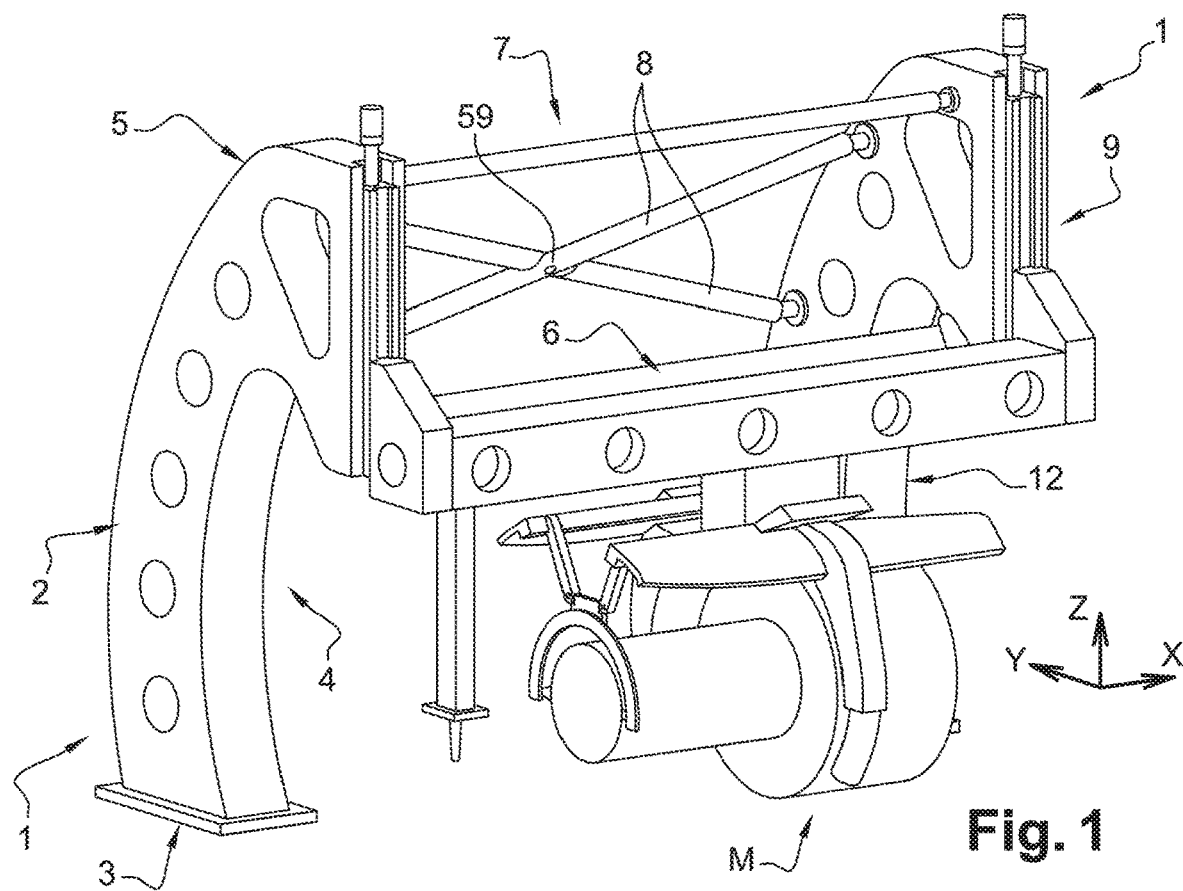

trajectory calculating control system integrating the structural deformations caused by the lifted weight, in order to correct the docking trajectories of the modules and ensure their utmost precision.

14 Claims, 7 Drawing Sheets

(58) Field of Classification Search
CPC . B23Q 3/00; B23Q 3/06; B23Q 3/063; B23Q 3/065; B23Q 3/103; B23Q 3/154; B25B 11/00; B25H 11/00; B25H 11/0007; B25D 65/18; B66C 1/108; B66C 1/107; B66C 1/62; F01D 25/285; F05D 2230/68
USPC .................. 248/131; 269/46, 50, 58, 79, 71; 29/281.1, 281.4, 281.5, 430; 294/67.31; 414/225.01, 589, 754
See application file for complete search history.

(56) References Cited

U.S. PATENT DOCUMENTS

| | | | | |
|---|---|---|---|---|
| 2,348,309 A * | 5/1944 | Rohr | ......................... | B66C 1/10 294/67.5 |
| 2,383,503 A * | 8/1945 | Landis | ................... | B23K 37/04 269/46 |
| 2,703,252 A * | 3/1955 | Blackwell | ................. | B66C 1/10 294/67.5 |
| 3,623,620 A * | 11/1971 | Vermette | ................... | B66F 9/19 414/420 |
| 3,887,080 A * | 6/1975 | Wilson | ................... | B66C 11/02 212/318 |
| 4,166,647 A * | 9/1979 | Schmidt | ................... | B66C 1/62 294/86.41 |
| 4,202,539 A * | 5/1980 | Polastri | ................. | B23Q 1/527 269/287 |
| 4,496,280 A * | 1/1985 | Brems | ................. | B21D 43/105 198/468.2 |
| 4,586,359 A * | 5/1986 | Parks | ....................... | B21D 1/14 269/71 |
| 4,842,473 A * | 6/1989 | Zbornik | ............... | B21D 43/105 294/188 |
| 5,088,610 A * | 2/1992 | Garnier | ...................... | B25J 5/00 212/196 |
| 5,375,952 A * | 12/1994 | Line | ........................ | B23Q 1/012 408/234 |
| 5,440,943 A * | 8/1995 | Holt | ........................ | B25J 9/1694 74/89.23 |
| 5,575,607 A * | 11/1996 | Grout | ...................... | B66C 19/00 414/589 |
| 6,202,566 B1 | 3/2001 | Hutchinson | | |
| 6,474,922 B2 * | 11/2002 | Bachman | .................. | B66C 1/34 212/278 |
| 6,619,466 B1 * | 9/2003 | Jack | ....................... | B62D 65/18 198/346.1 |
| 6,994,510 B2 * | 2/2006 | Cooke | .................... | B62D 65/18 414/618 |
| 2001/0048188 A1 * | 12/2001 | DuVernay | ............... | B25B 11/00 269/17 |
| 2007/0033795 A1 * | 2/2007 | McCaffrey | .............. | B66C 11/12 29/464 |
| 2011/0127229 A1 * | 6/2011 | Laliberte | ................. | B66C 11/16 212/312 |
| 2014/0250833 A1 * | 9/2014 | Piani | ....................... | B65B 51/02 53/399 |
| 2015/0028610 A1 * | 1/2015 | Hansen | ................... | F03D 13/40 294/81.55 |
| 2015/0081078 A1 * | 3/2015 | Frascati | ............. | B23Q 11/0014 700/114 |

FOREIGN PATENT DOCUMENTS

| | | |
|---|---|---|
| GB | 702487 A | 1/1954 |
| WO | 2005014377 A1 | 2/2005 |

OTHER PUBLICATIONS

Written Opinion for International Application No. PCT/FR2016/052791 dated Mar. 24, 2017.
French Search Report issued in Patent Application No. FR 15 60377 dated Sep. 23, 2016.

* cited by examiner

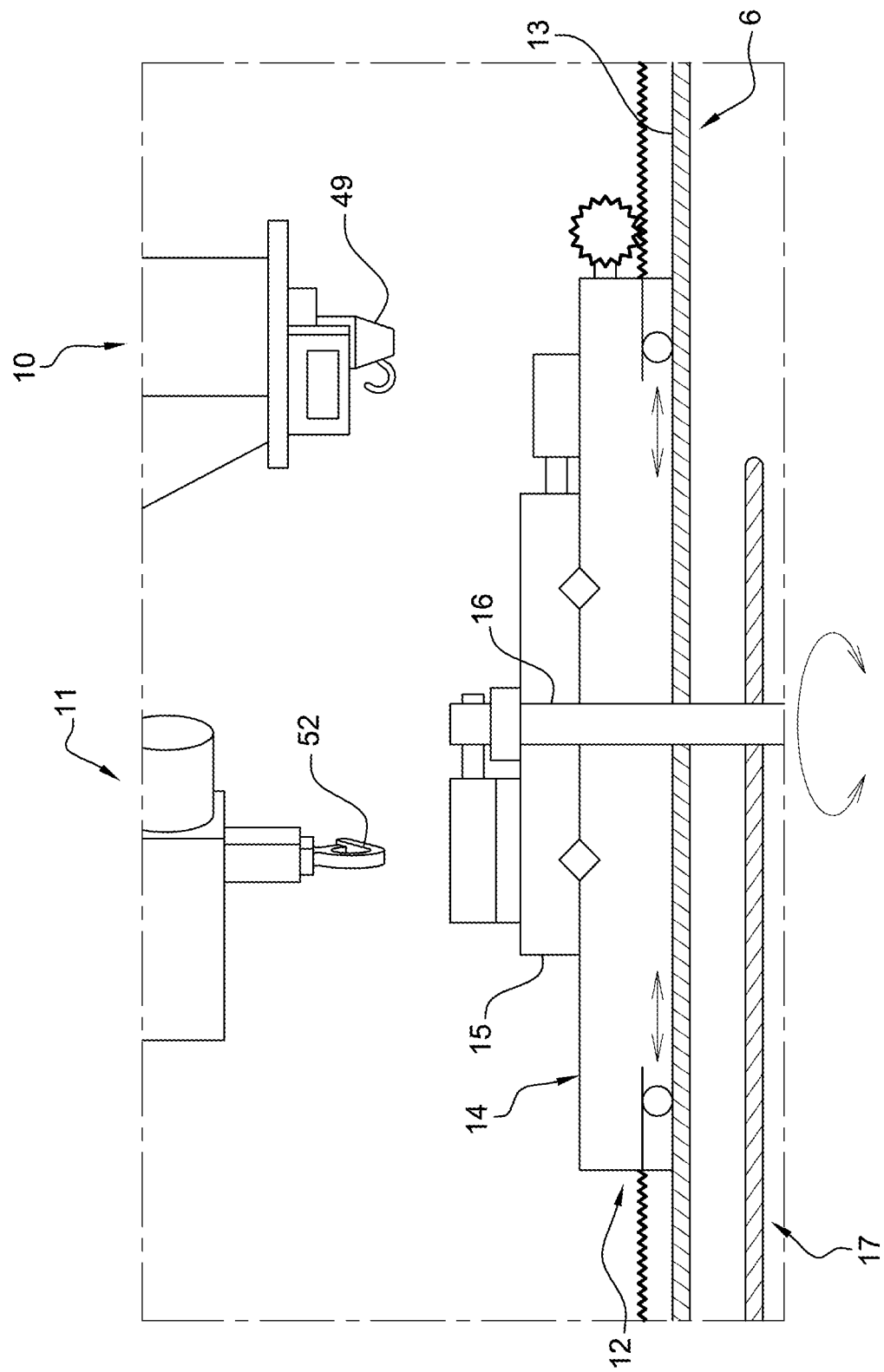

ENGINE ASSEMBLY STAND

This is a National Stage application of PCT international application PCT/FR2016/052791, filed on Oct. 27, 2016 which claims the priority of French Patent Application No. 15 60377 entitled "ENGINE ASSEMBLY STAND", filed Oct. 29, 2015, both of which are incorporated herein by reference in their entirety.

The subject matter of the present invention is a stand for assembling an engine, more precisely designed for large revolution-shaped engines, such as aircraft turbomachines, without excluding other applications.

Such engines are comprised of several bulky and heavy modules which must be assembled to each other. The modules come to the assembly location on carriages, are lifted, and secured to each other to perform assembly. A large positioning accuracy is necessary, as well as a careful handling because of the brittleness of some components of the modules. This is difficult to make on voluminous and heavy parts. Existing assembly stands turn out to be somewhat insufficient in this regard. An example is described in document FR 2 952 842 A. A stand incorporated to a vehicle assembly line is the subject matter of WO 2005/014 377.

Positioning inaccuracies come from several causes. Modules are first subjected to oscillations, once they are lifted. Their weight then deforms, in a significant way, the stands when it supports them, which makes the module securement positions unpredictable.

Other drawbacks of known stands relate to difficulties in accessing the modules, either from the bottom once they are mounted to the stand, or at some places of their periphery.

An essential purpose of the invention is thus to provide a stand which offers accuracy and position repeatability which is necessary for a proper operation of the module securements. Another purpose, related to the previous one, is to place accurately the modules already mounted on the stands at different positions or different orientations, in order to make the successive assemblies under various conditions depending on the assembly phase and the engine version to be assembled.

Under a general form, the invention relates to a stand for assembling an engine, the stand comprising: a horizontal beam; two posts; two guide and rise-lower means each connecting one end of the beam to one of the posts; a carriage laid on the beam and movable along the beam; a swing tray suspended to the carriage; a means for rotating the swing tray about a vertical axis connecting the swing tray to the carriage, the swing tray comprising a cradle for fastening the engine.

This combination of means enables the qualities and advantages just discussed to be achieved in a large extent. The module mounted to the cradle can be horizontally and vertically oriented and moved. The use of a beam on which the support of tackles and the movable carriage supporting the swing tray slide contributes to a proper relative positioning of the modules. The posts and the beam can be designed very rigid and thus subjected to few deformations, and their cohesion makes these deformations predictable and reproducible at an identical lifted load, which can be exploited as will be detailed later. And the cradle comprises a first part connected to the vertical axis, a second part carrying engine fastening means, and a means for moving the second part along the first part, the second part being supported by the first part, the first part and the second part being arc-shaped. A large position freedom is achieved, the engine angular position being thus possibly adjusted at will.

According to an improvement, the carriage includes a first part connected to the beam and a second part connected to the vertical axis, and means for moving the second part with respect to the first one in a horizontal direction perpendicular to the beam. The module mounted to the cradle can thereby be moved sideways, which further improves the positioning freedom.

A significant improvement is made by adding to the device, one, advantageously two lift tackles laid on the beam and movable along the beam. The tackles offer the same motion possibilities to another module (or to any equipment attached thereto), which enables the modules to be moved close to each other, while keeping them at well-determined positions. Securements are thus facilitated. Therefore, it is recommended that the tackles carry a sensor for the load weight they lift, advantageously a triaxial lifted load weight sensor. The knowledge of this weight thus enables the deformation of the supports and thus the motions that should be initiated to be evaluated in order to achieve an accurate securement of the modules. Furthermore, the following of the horizontal forces indicate the presence and magnitude of the securement strains.

Another means to increase accuracy and reliability of the securements of modules to be assembled is achieved if the movement means connect the mutually movable parts of the stand and comprise, between two parts they connect, guide means with prestressed intermediate rolling elements mounted without play.

Rigidification of the stand is increased by adding junction beams to connect the posts to each other, the junction beams comprising oblique beams having crossed directions.

The securements can thereby be advantageously achieved in an almost automatic way by a digital device associated with the stand, which can be designed to impose necessary motions to the securement with a large accuracy, by moving the stand components. This device comprises digital means for automatically correcting the movements, based on the weights of the loads lifted by the tackles and supported by the cradle. Indeed, the knowledge of the loads, together with a proper deformation repeatability, enable them to be calculated.

The deformation repeatability is ensured in particular if the means for moving the stand elements comprise, between two parts they connect, guide means with prestressed intermediate rolling elements mounted without play.

Figure 3:
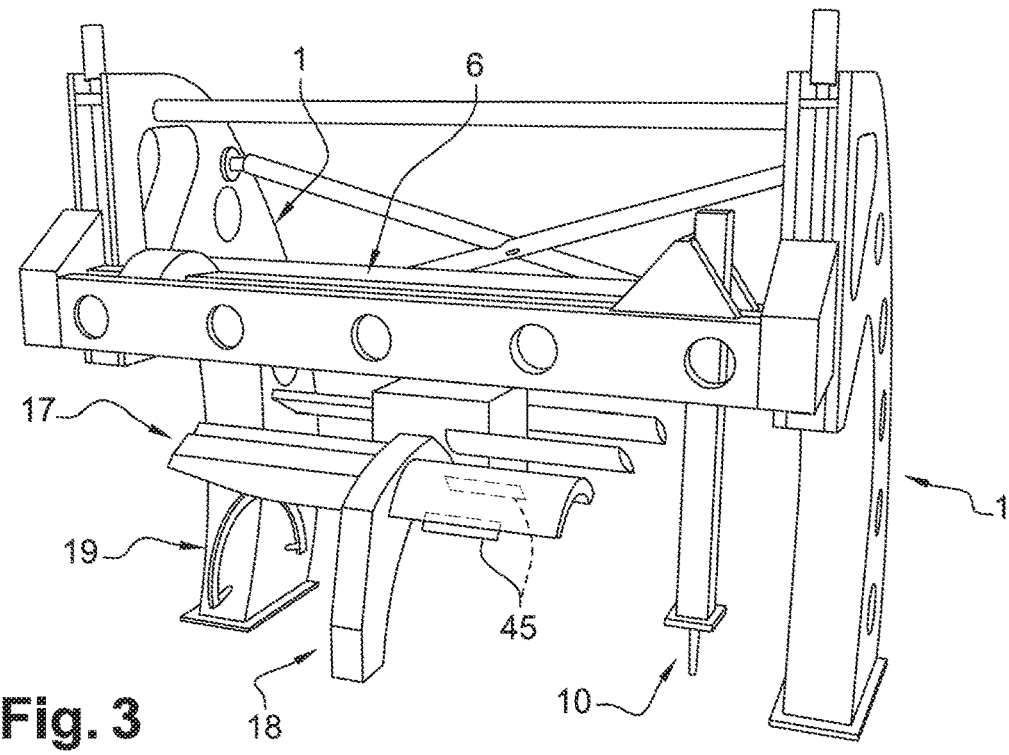
Figure 4:
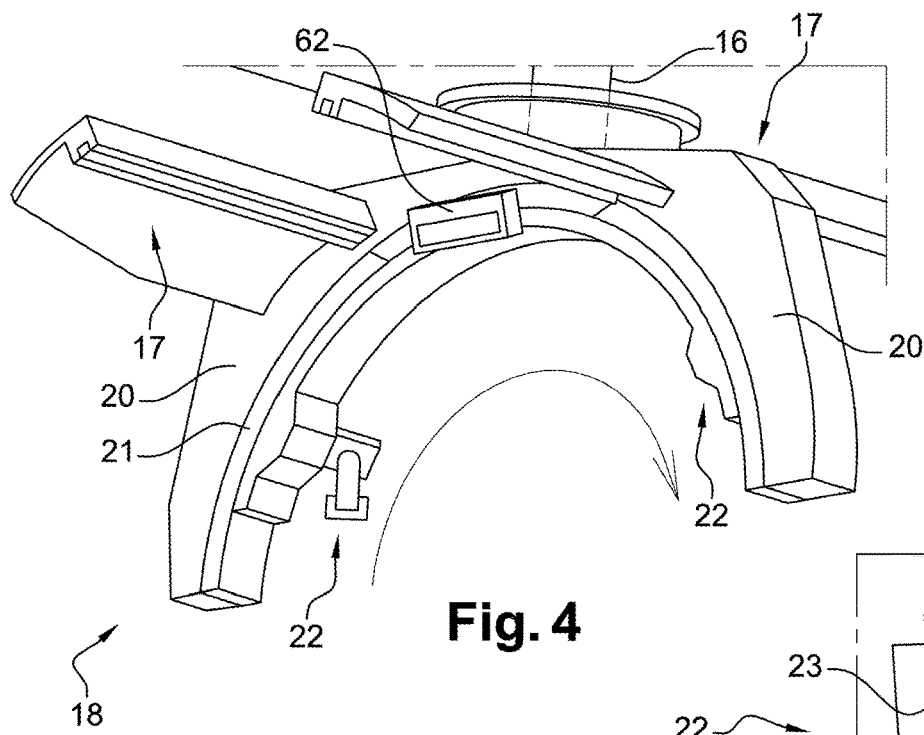
Figure 5:
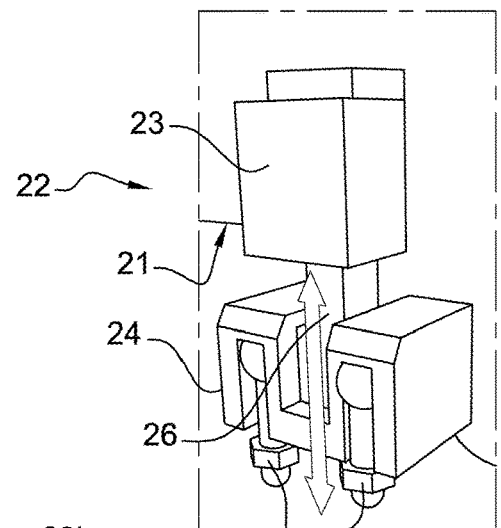
Figure 6:
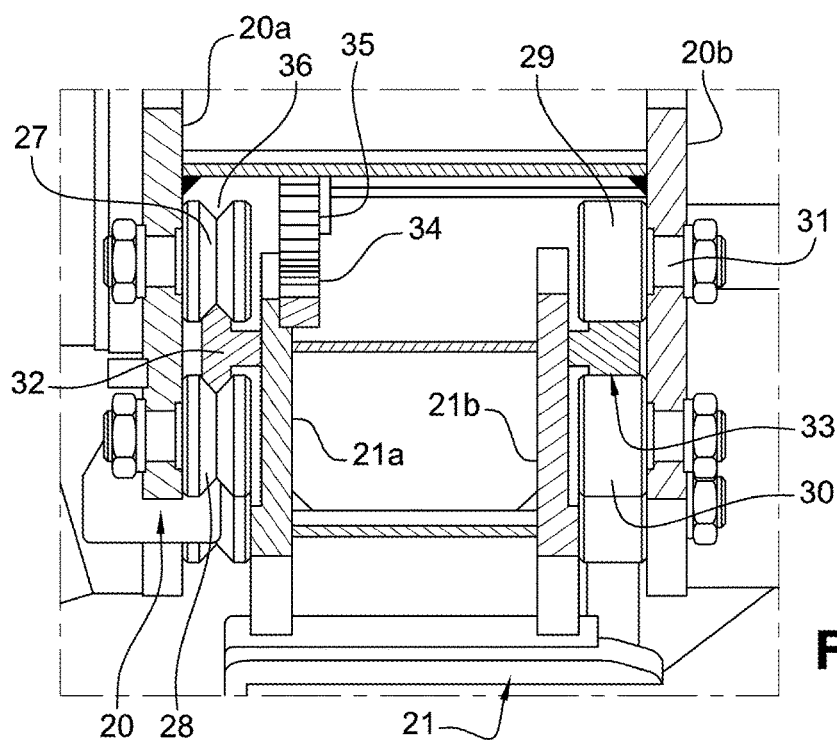
Figure 7:
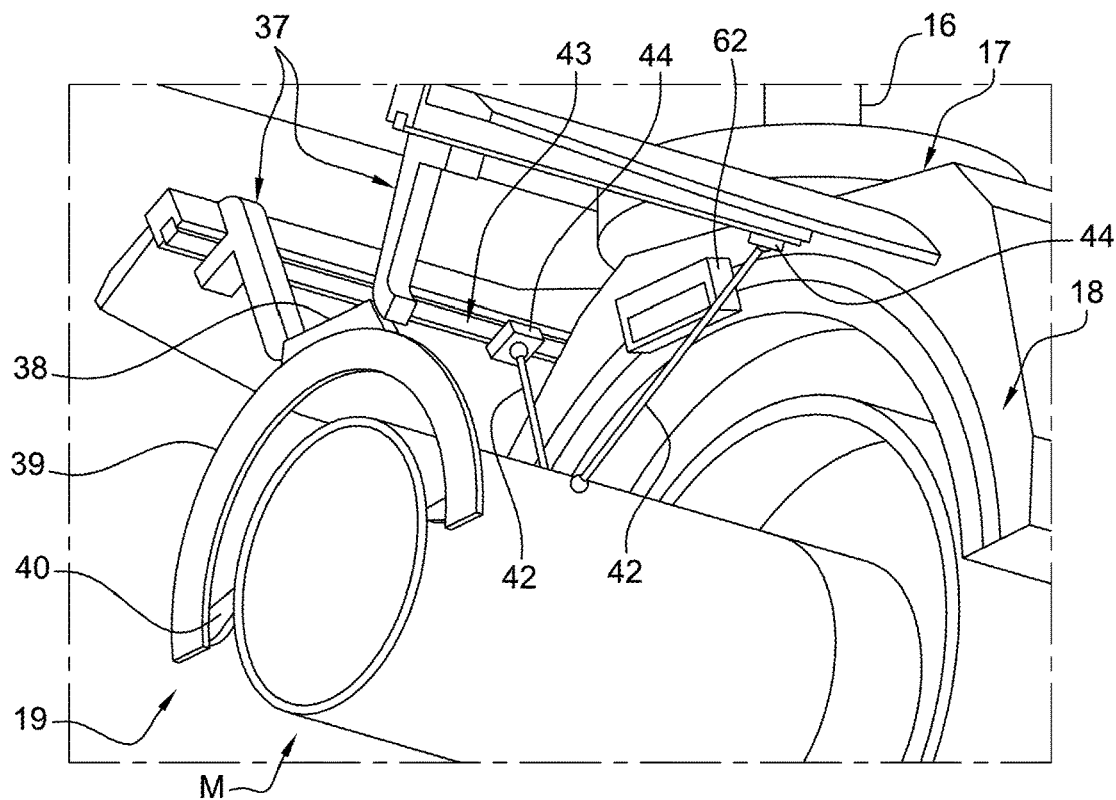
Figure 8:
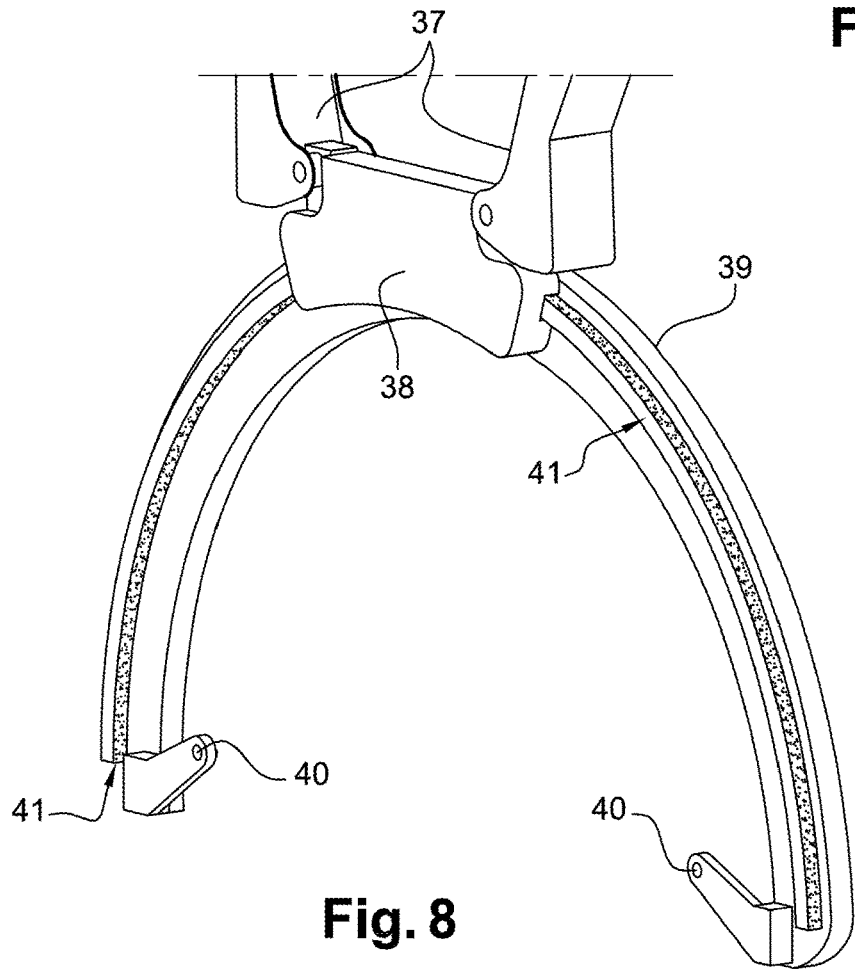
Figure 9:
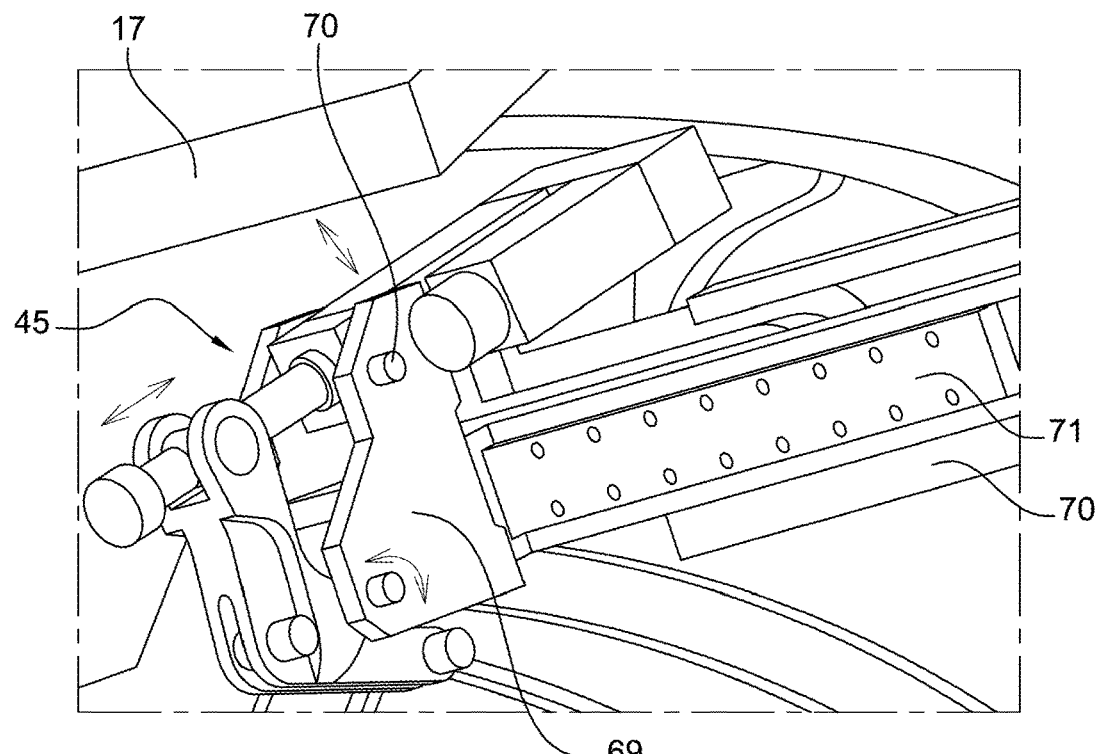
Figure 13:
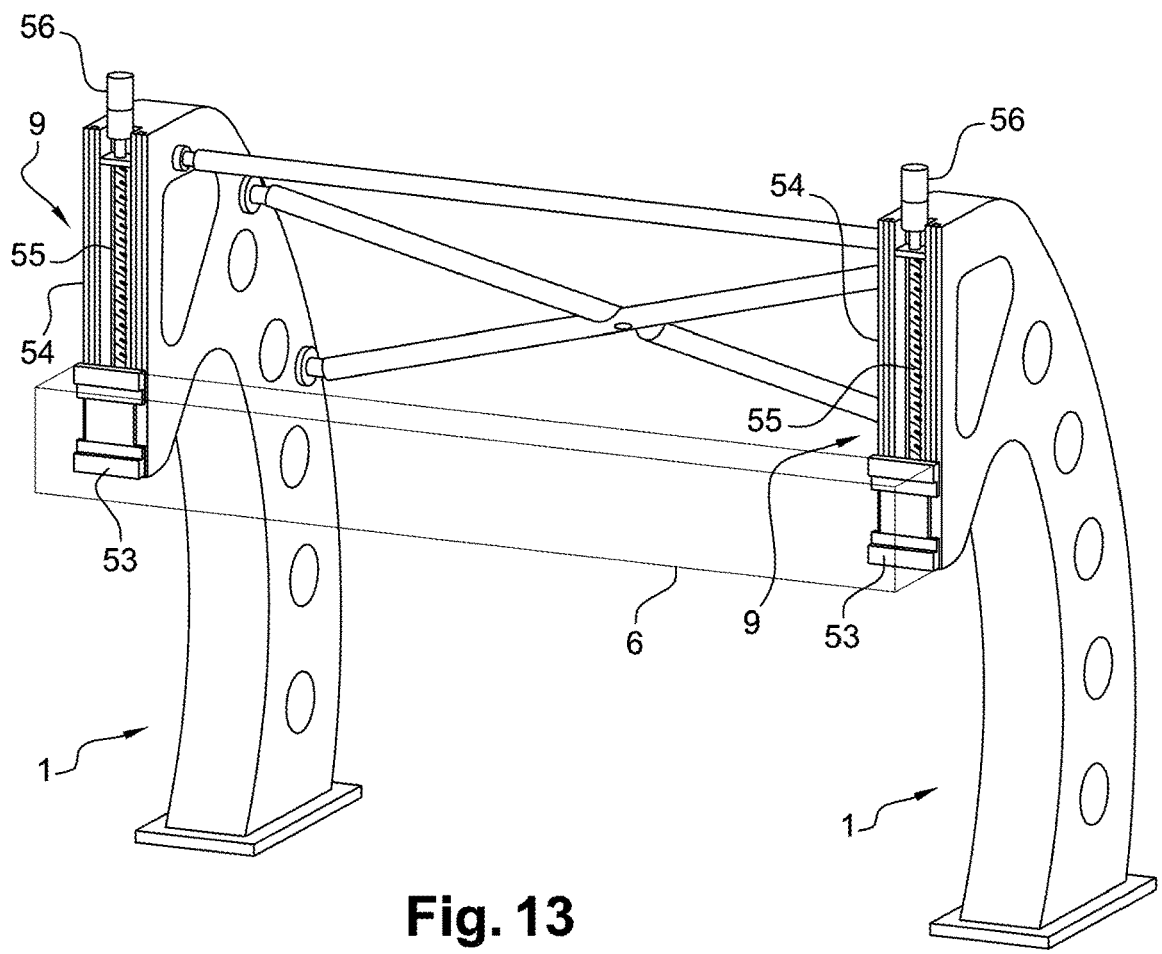
Figure 10:
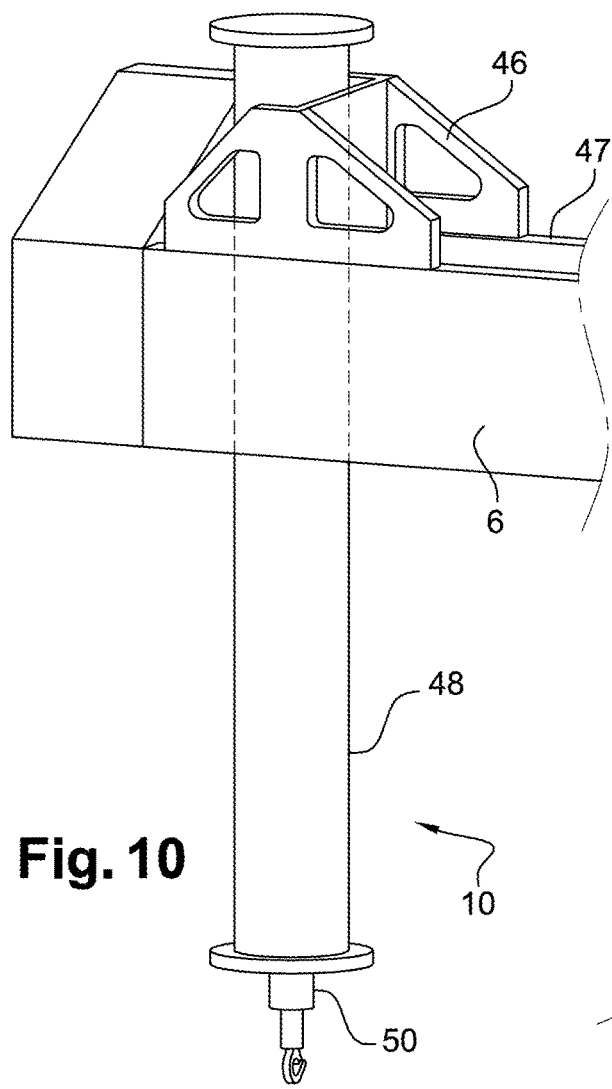
Figure 11:
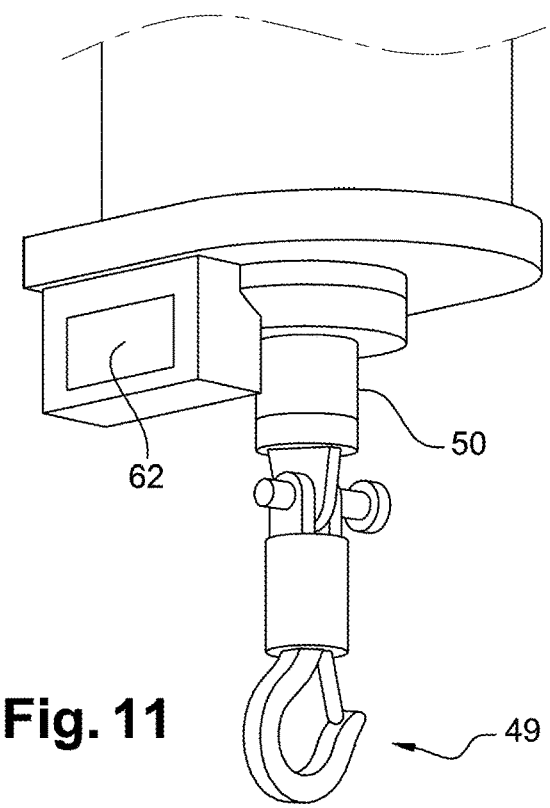
Figure 12:
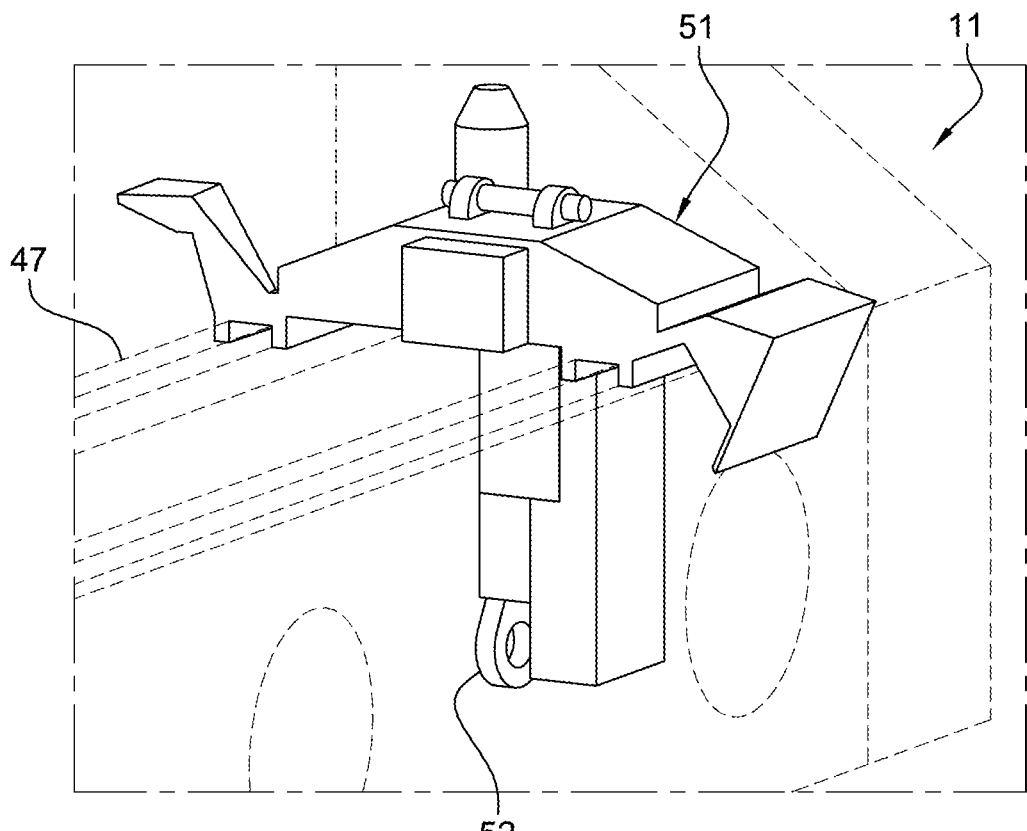
Figure 14:
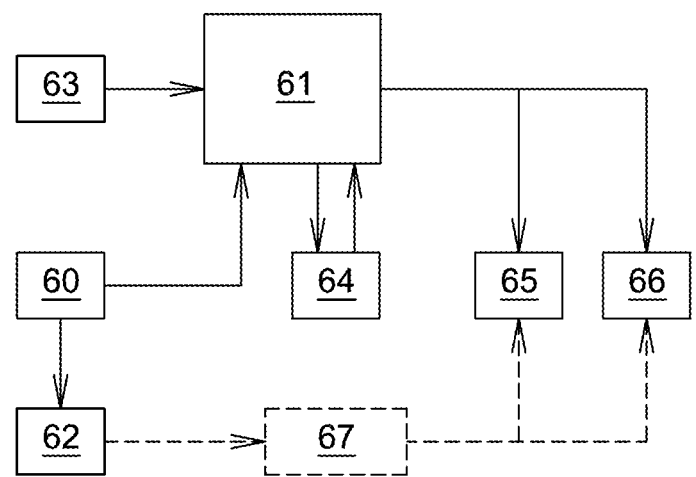

The different aspects, characteristics and advantages of the invention, including those which have been indicated above and other ones, will now be described in further detail by means of the following figures, which represent a particular embodiment of the invention, given by way of illustrating purposes:

FIG. 1 is a general view of the stand;
FIG. 2 illustrates the movable carriage carrying the modules assembled;
FIG. 3 is a general view of the swing tray;
FIG. 4 illustrates the main cradle for supporting the modules;
FIG. 5 illustrates a module fastening device;
FIG. 6 represents in a cross-section the mechanism of the main cradle;
FIG. 7 is another view of the swing tray;
FIG. 8 illustrates the auxiliary cradle;
FIG. 9 illustrates an adjusting cylinder;
FIG. 10 illustrates the main lift tackle;
FIG. 11 illustrates the bottom of said tackle;
FIG. 12 illustrates the auxiliary tackle;

FIG. 13 illustrates the mounting of the horizontal beam to the stand;

and FIG. 14 represents the stand control device.

FIG. 1 is first referred to. The stand comprises two similar posts 1, parallel and substantially vertical, each comprised of a rising part 2 erecting from a foot 3 fastened to a frame on the ground, tilted away from a longitudinal beam 6, for supporting the engine M and which will be described later, in the rising direction, on at least part of its height; the rising part 2 is also provided with a curvature the concavity 4 of which is directed to an engine M being assembled to the stand, and with an upper vault curved part 5 and extending between the rising part 2 and a vertical face carrying means for connecting to the horizontal beam 6. This post 1 shape, referred to as swan neck shape, has a pleasant aspect, while offering a reduced cantilever, a proper rigidity and a small covered area, which offers a great freedom to work about the engine and to bring from various places the equipment and modules to be mounted. The rigidity of the stand is increased by bars 7 connecting the posts 1 between them, and some of which, noted 8, cross each other and on the other hand are connected to each other at a crossing point 59, by thus strongly opposing to the various flexure (symmetrical and antisymmetrical) modes of the posts 1 in the direction of extension of the horizontal beam 6 (axis X of the reference frame represented). The posts 1 are on the other hand particularly rigid with regard to the flexures in the plane of the two other axes Y and Z of the reference frame.

The horizontal beam 6 is translationally vertically movable (axis Z), by virtue of rise-lower devices 9, which connect each of its ends to an upper part 5 of the post 1 respectively. These rise-lower devices 9 will be also be described later.

The horizontal beam 6 carries two tackles 10 and 11, as well as a carriage 12. The tackles 10 and 11 are intended to lift various pieces of equipment essential for assembling engines. First, the carriage 12 is described, which is intended to support the engine M mounted to the stand, with regard to FIGS. 2 and 3 as well. The carriage 12 is movable on a lower track 13 of the horizontal beam 6, which extends in its main direction of extension (X). It comprises a lower table 14 directly laid onto the lower track 13, and an upper table 15 laid onto the lower table 14 and horizontally movable with respect to the same, in the perpendicular direction (Y). The upper table 15 carries a vertical axis 16 of rotation which extends under the horizontal beam 6 and rotates a part called a swing tray 17 about the vertical axis Z. The swing tray 17 carries a main cradle 18 and an auxiliary cradle 19 to which the engine M is fastened.

The description of the main cradle 18 is now given. It includes, as shown in FIG. 4, a first part 20 extending under the swing tray 17 and having an arc shape, and a second part 21 also of an arc shape, included in the previous one and that can pivot on itself about an axis parallel to the axis X and which coincides with the axis of the engine M in a mounted state, which enables its roll tilt and that of the engine M, which is suspended thereto, to be modified. The second part 21 carries to that end devices 22 for fastening the engine M at its ends, which is represented in FIG. 5. They comprise an upper cap 23 bolted to the second part 21, a lower calliper 24 carrying bolts 25 for receiving and fastening points for attaching the engine M which are not represented, and a rod 26 to which the lower calliper 24 is suspended and which is retained by its upper end in the upper cap 23. By virtue of this device, an excessive lowering of the engine M for example, to deposit it onto a carriage after mounting, will not cause damage, since the rods 26 will lift in the upper caps 23 when the engine M is laid, and they will absorb thereby the over-strokes of the rise-lower devices 9.

FIG. 6 illustrates how the second part 21 is retained by the first part 20. The latter is provided with two pairs of curved rows of rolls, all in arc of circles about a same central axis, comprising a row of grooved eccentric rolls 27 and a row of grooved concentric rolls 28 on one side, and a pair of straight eccentric rolls 29 and a row of straight concentric rolls 30 on the other side. The rolls 27, 28 and 29, 30 are sandwiched between flanks 20a or 20b of the first part 20 and flanks 21a or 21b parallel to the second part 21. Their axes of rotation 31 are mounted on the flanks 20a and 20b of the first part 20. The second part 21 is precisely supported by a first rail 32 in arc of circle, fastened to one of the flanks 21a of the second part 21 and retained between the grooved rolls 27 and 28, and a second rail 33, opposite to the previous one, fastened to the other flank 21b of the second part 21 and retained between the straight rolls 29 and 30. The assembly is made with a slight prestress which removes the play and thus ensures a large position accuracy of the second part 21 with respect to the first part 20 and the motions imposed thereto; as will be seen, such assemblies without play of transmission elements will generally be used between mutually movable parts of the stand, to achieve the same advantages. The side position of the second part 21 is ensured by the projecting shape at half thickness of the first rail 32, which enables it to perfectly fit the section of the grooves of the rolls 27 and 28. The second rail 33 is flat. A bent rack 34 is on the other hand fastened to the flank 21a and it meshes with a pinion 35 by an engine 36 fastened to the first part 20. By virtue of this arrangement, the rotation of the second part 21 on the first part 20 becomes possible. The motion amplitude can be +/−70° to rotate the engine M mounted to the stand and place all its parts at a height or orientation facilitating manual assembly operations.

FIGS. 7 and 8 are referred to. The auxiliary cradle 19 comprises a pair of rigid arms 37 suspended to the swing tray 17, a first part 38 suspended to the arms 37, and a second part 39 gliding on the first part 38. Both parts 38 and 39 are arc-shaped (the first can however be short), and have the same rotational motion one on the other as the parts 20 and 21 of the main cradle 18. All these parts 20, 21 and 38, 39 of an arc shape are coaxial on the other hand. The ends of the second part 39 carry devices 40 for fastening the engine M, of any nature (tabs provided with a hole for inserting a fastening bolt have been represented here), and the second part 39 is suspended to the first part 38 through a rail 41 it includes on one side, the cross-section of which can be the same as that of the first rail 32 of FIG. 6, and which is retained by a guide curved system with recirculating balls, located in the first part 38. However, since the strains of the weight of the engine M undergone by the auxiliary cradle 19 are less significant, the guide device is simpler, and thus less extended in angular direction. No drive motor is present, the second part 39 following the rotation motions imposed by the second part 21 of the main cradle 18.

The swing tray 17 further comprises stretching screws 42, which can also support the engine M upon being assembled between the cradles 18 and 19. They consist of tensioned rods with adjustable lengths which can be moved in the longitudinal direction of the swing tray 17, by sliding carriages 44 to which they are suspended on rails 43.

Electromechanical cylinders 45 are disposed (FIG. 9) under the swing tray 17, so as to be attached to the engine M and vary its pitch by swinging it about the transverse axis Y, by a motion of running in the axis X. Thus, the attitude of the engine M is restored by making its axis of rotation horizontal. Two of these electromechanical cylinders 45 are arranged, on either side of the centre of the swing tray 17 with parallel directions of running.

The general description of the main tackle 10 will now be made in connection with FIGS. 10 and 11. It is mounted on a movable carriage 46 sliding on an upper track 47 of the horizontal beam 6. It comprises a vertical tube 48, which passes through the horizontal beam 6, extends under it and includes at its lower end, a lifting hook 49 suspended to the rigid tube 48 through an intermediate part comprising a triaxial strain sensor 50. The auxiliary tackle 11 also comprises a movable carriage 51 on the same upper track 47 and a chain 52 that can be unwind under the movable carriage 49 with a variable length (FIG. 12).

FIG. 2 is referred again. If, in the usual state of the stand, the tackles 10 and 11 are located on either side of the movable carriage 12 and of the swing tray 17, this state is not imposed, since the carriage 12 slides on the lower track 13, which is located clearly below the upper track 47. By rising the vertical tube 48 and winding the chain 52, it is possible to pass the tackles 10 and 11 above the movable carriage to place both of them on any side of the swing tray 17. Thus, it is possible to make them go down between the rigid arms 37.

Some technology details will now be given.

FIG. 13 shows that the horizontal beam 6 is suspended to carriages 53 movable along vertical sliders 54, each comprised of a pair of parallel rails, set on planar faces of the posts 1. The carriages 53 are retained between the pair of rails, by interposing a conventional recirculating ball system which is not represented. The device further comprises an endless screw 55, disposed between each of the pairs of rails, driven by an engine 56 fastened to the top of the respective post 1, and the rotation of which rises or lowers a nut fastened to the carriage 53. The ball guides of the carriages 53 can be prestressed and thus free of plays and the engines 56 are synchronised to each other by absolute coder masterslave variators equipped with brakes. This device thus enables high accuracy motions of the horizontal beam 6 to be controlled because of the absence of plays, with a large safety because of the movement irreversibility between the endless screws and nuts, and the beam is held horizontal, thanks to the synchronisation of the engines 56.

The horizontal motions of the swing tray 17 in both directions are ensured by means of analogous guide means which connect the lower table 14 to the horizontal beam 6, on the one hand, and to the upper table 15, on the other hand, and which comprise sliders on which the tables 14 and 15 slide with prestressed intermediate balls, still to ensure assemblies without play and a great position accuracy at any time. The motions can be ensured either by rack and pinion mechanisms, or by ball screws. The vertical axis 16 can be mounted to the upper table 15 by a preloaded crossed roller bearing. The electromechanical cylinders 45 are fastened to caps 69 by journals 70, and are deployed by transmission belt systems without play and with ball screws. They are fastened to the swing tray 17 in sliders 70, by guide rails 71 with prestressed ball carriage, which ensure the absence of significant deformation under load.

The vertical tube 48 of the tackle 10 is moved on the movable carriage 46 by a mechanism analogous to that of the rise-lower systems 9 of the horizontal beam 6, described in FIG. 13. The lift engine, which is mounted to the movable carriage 46, however drives a rotating nut, and the vertical tube 48 carries a fixed screw and the sliders of the guide system, which slide in the movable carriage 46.

The translation of the tackles 10 and 11 is further made by means of guide systems without play, and the motion is ensured by rack and pinion systems.

The conjunction of the guide mechanisms without play and engine driving systems possibly driven with great accuracy, thanks to transmissions also without play and high gear ratio reducers, enables the modules of the engine M to be placed at well-defined positions and thus their securement to be ensured. Moreover, the triaxial sensor 50 measures the weight of the loads which are successively lifted by the tackle 10 and assembled to each other to form the engine M step by step.

FIG. 14 schematically and synthetically represents the stand control. The sensors 60, comprising the triaxial sensor 50 and position sensors for different mechanical assemblies, provide indications thereof to a control system 61; some of these indications, as the measurements of the triaxial sensor 50, also appear on displays 62, which are disposed at different places of the stand, so as to remain visible for the operators.

As the lifted weights and the positions of the different elements are known, the control system 61 calculates deformations 64 of the different elements of the stand. It can make use of the measurements of calibrations made beforehand, for example by means of a laser, and stored in a library 63. Therefore, it deduces therefrom, trajectory corrections that are to be imposed to the elements, and in particular to the lift of the tackles 10 and 11, to control securement of the modules with great accuracy. The trajectories corrected based on the deformations being calculated, the control system 61 acts on the engines 65 to control the securement trajectories, and imposes speed functions along trajectories by means of speed variators 66 appended to the engines. The operators (symbolised by the mark 67) however keep the initiative of the motions, and can impose manual corrections to the trajectories, by acting on the engines 65 and the speed variators 66, based on reading the displays 62.

An assembly sequence can comprise the following steps. A first module of the engine M, placed on a movable carriage, is brought below the swing tray 17. This is then lowered and rotated until the main cradle 18 is placed at the proper height and proper orientation. The horizontal motions of the swing tray 17 place the fastening devices 22 in front of the corresponding means provided on the module, and the fastening is then carried out. The module is lifted and replaced at a suitable orientation to receive other modules, which are this time lifted by the main tackle 10 and advanced to the swing tray 17, by moving the main tackle 10 onto the upper track. The auxiliary cradle 19 can be turned on when a high number of modules has been mounted to the main cradle 18 and when a further support becomes preferable. This can be made either by fastening another module to the auxiliary cradle and moving the auxiliary cradle to join this module to the engine M, or by fastening to the auxiliary cradle the engine M, already supported by the main cradle 18. When the main modules have been mounted by means of the main tackle 10 and possibly the auxiliary tackle 11, the auxiliary pieces of equipment of the engine M (pumps, electric motors, hoses, etc.) can be manually placed. The engine M is then free to be moved to the most convenient position, height and orientation for each operation; the possibility to rotate it about its axis also enables all its generators to be placed at a suitable height for the assemblies.

What is claimed is:

1. An assembly stand for assembling an engine, the stand comprising:
   a horizontal beam;
   two vertical posts;
   two guide and rise-lower means each connecting one end of the beam to one of the posts;
   a carriage laid on the beam and movable along the beam;
   a swing tray suspended to the carriage; and
   a means for rotating the swing tray about a vertical axis connecting the swing tray to the carriage, the swing tray comprising a cradle for fastening the engine,
   wherein the cradle comprises a first part connected to the vertical axis, a second part carrying a device for fastening the engine, and a means for slidingly pivoting the second part along the first part around a horizontal axis, the second part being supported by the first part, the first part and the second part being arc-shaped.

2. An assembly stand for assembling an engine, the stand comprising:
   a horizontal beam;
   two posts;
   two guide and rise-lower means each connecting one end of the beam to one of the posts;
   a carriage laid on the beam and movable along the beam;
   a swing tray suspended to the carriage; and
   a means for rotating the swing tray about a vertical axis connecting the swing tray to the carriage, the swing tray comprising a cradle for fastening the engine,
   wherein the cradle comprises a first part connected to the vertical axis, a second part carrying a device for fastening the engine, and a means for slidingly moving the second part along the first part, the second part being supported by the first part, the first part and the second part being arc-shaped, and
   wherein the swing tray comprises an auxiliary cradle which comprises a first part of the auxiliary cradle suspended to the swing tray, a second part of the auxiliary cradle carrying a means for fastening the engine, the second part of the auxiliary cradle being supported by the first part of the auxiliary cradle, the first part of the auxiliary cradle and the second part of the auxiliary cradle being arc-shaped, the second part of the auxiliary cradle freely sliding along the first part of the auxiliary cradle, the arcs of the cradle and the auxiliary cradle being coaxial.

3. An assembly stand for assembling an engine, the stand comprising:
   a horizontal beam;
   two posts;
   two guide and rise-lower means each connecting one end of the beam to one of the posts;
   a carriage laid on the beam and movable along the beam;
   a swing tray suspended to the carriage;
   a means for rotating the swing tray about a vertical axis connecting the swing tray to the carriage, the swing tray comprising a cradle for fastening the engine; and
   at least one lift tackle laid on the beam and movable along the beam,
   wherein the cradle comprises a first part connected to the vertical axis, a second part carrying a device for fastening the engine, and a means for slidingly moving the second part along the first part, the second part being supported by the first part, the first part and the second part being arc-shaped.

4. The assembly stand according to claim 3, wherein the tackle carries a lifted load sensor.

5. The assembly stand according to claim 4, wherein the lift load sensor is a triaxial lifted load sensor.

6. The assembly stand according to claim 3, wherein the tackle is movable on a track of the beam which is superimposed with another track of the beam on which the carriage is movable, and the tackle can be lifted by extending fully to an upper level at a top of the movable carriage and of the swing tray.

7. An assembly stand for assembling an engine, the stand comprising:
   a horizontal beam;
   two posts;
   two guide and rise-lower means each connecting one end of the beam to one of the posts;
   a carriage laid on the beam and movable along the beam;
   a swing tray suspended to the carriage; and
   a means for rotating the swing tray about a vertical axis connecting the swing tray to the carriage, the swing tray comprising a cradle for fastening the engine,
   wherein the cradle comprises a first part connected to the vertical axis, a second part carrying a device for fastening the engine, and a means for slidingly moving the second part along the first part, the second part being supported by the first part, the first part and the second part being arc-shaped, and
   wherein the carriage includes a first part connected to the beam and a second part connected to the vertical axis, the second part of the carriage being movable with respect to the first part of the carriage in a horizontal direction that is perpendicular to a direction that the first part of the carriage moves in.

8. An assembly stand for assembling an engine, the stand comprising:
   a horizontal beam;
   two posts;
   two guide and rise-lower means each connecting one end of the beam to one of the posts;
   a carriage laid on the beam and movable along the beam;
   a swing tray suspended to the carriage; and
   a means for rotating the swing tray about a vertical axis connecting the swing tray to the carriage, the swing tray comprising a cradle for fastening the engine,
   wherein the cradle comprises a first part connected to the vertical axis, a second part carrying a device for fastening the engine, and a means for slidingly moving the second part along the first part, the second part being supported by the first part, the first part and the second part being arc-shaped, and
   wherein the device for fastening the engine comprises an upper body and a lower body, the lower body being movable in a vertical direction relative to the upper body.

9. An assembly stand for assembling an engine, the stand comprising:
   a horizontal beam;
   two posts;
   two guide and rise-lower means each connecting one end of the beam to one of the posts;
   a carriage laid on the beam and movable along the beam;
   a swing tray suspended to the carriage;
   a means for rotating the swing tray about a vertical axis connecting the swing tray to the carriage, the swing tray comprising a cradle for fastening the engine; and
   junction beams connecting the posts to each other, the junction beams comprising oblique beams having crossed directions, wherein the cradle comprises a first part connected to the vertical axis, a second part carrying a device for fastening the engine, and a means for slidingly moving the second part along the first part, the second part being supported by the first part, the first part and the second part being arc-shaped.

10. An assembly stand for assembling an engine, the stand comprising:
   a horizontal beam;
   two posts;
   two guide and rise-lower means each connecting one end of the beam to one of the posts;
   a carriage laid on the beam and movable along the beam;
   a swing tray suspended to the carriage; and
   a means for rotating the swing tray about a vertical axis connecting the swing tray to the carriage, the swing tray comprising a cradle for fastening the engine,
   wherein the cradle comprises a first part connected to the vertical axis, a second part carrying a device for fastening the engine, and a means for slidingly moving the second part along the first part, the second part being supported by the first part, the first part and the second part being arc-shaped, and
   wherein the posts comprise a rising part, tilted away from the horizontal beam in a rising direction, and a vault curved top part, connecting the rising part to the horizontal beam.

11. An assembly stand for assembling an engine, the stand comprising:
   a horizontal beam;
   two posts;
   two guide and rise-lower means each connecting one end of the beam to one of the posts;
   a carriage laid on the beam and movable along the beam;
   a swing tray suspended to the carriage;
   a means for rotating the swing tray about a vertical axis connecting the swing tray to the carriage, the swing tray comprising a cradle for fastening the engine; and
   a control device for controlling movement of components of the stand, the control device comprising digital means for automatically correcting the movements of the components of the stand based on weights supported by the cradle,
   wherein the cradle comprises a first part connected to the vertical axis, a second part carrying a device for fastening the engine, and a means for slidingly moving the second part along the first part, the second part being supported by the first part, the first part and the second part being arc-shaped.

12. The assembly stand according to claim 3, characterised in that the control device comprises digital means for automatically correcting the movements of the components of the stand based on the weights lifted by the tackle (10).

13. The assembly stand according to claim 1, further comprising a lifted or supported weight display.

14. An assembly stand for assembling an engine, the stand comprising:
   a horizontal beam;
   two posts;
   two guide and rise-lower means each connecting one end of the beam to one of the posts;
   a carriage laid on the beam and movable along the beam;
   a swing tray suspended to the carriage; and
   a means for rotating the swing tray about a vertical axis connecting the swing tray to the carriage, the swing tray comprising a cradle for fastening the engine,
   wherein the cradle comprises a first part connected to the vertical axis, a second part carrying a device for fastening the engine, and a means for slidingly moving the second part along the first part, the second part being supported by the first part, the first part and the second part being arc-shaped, and
   wherein the means for slidingly moving comprise, between first part and the second part, guide means with prestressed intermediate rolling elements mounted without play.

\* \* \* \* \*